(12) United States Patent      (10) Patent No.:    US 12,691,825 B2

Huang                 (45) Date of Patent:      Jul. 28, 2026

(54) BLIND SPOT ASSISTANCE DISPLAY SYSTEM AND VEHICLE

(71) Applicant: HON HAI PRECISION INDUSTRY CO., LTD., New Taipei (TW)

(72) Inventor: Yi-Heng Huang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 19/173,993

(22) Filed: Apr. 9, 2025

(65) Prior Publication Data

US 2026/0152124 A1     Jun. 4, 2026

(30) Foreign Application Priority Data

Nov. 29, 2024    (CN) .......................... 202411742826.5

(51) Int. Cl.

| | |
|---|---|
| *B60R 1/26* | (2022.01) |
| *B60R 1/12* | (2006.01) |
| *G06F 3/14* | (2006.01) |
| *G06V 20/58* | (2022.01) |
| *G09G 3/34* | (2006.01) |
| *H04N 7/18* | (2006.01) |

(52) U.S. Cl.
CPC .................. *B60R 1/26* (2022.01); *B60R 1/12* (2013.01); *G06F 3/1446* (2013.01); *G06V 20/58* (2022.01); *G09G 3/3406* (2013.01); *H04N 7/181* (2013.01); *B60R 2001/1253* (2013.01); *B60R 2300/802* (2013.01); *G09G 2320/062* (2013.01); *G09G 2380/10* (2013.01)

(58) Field of Classification Search
CPC ..... B60R 1/26; B60R 1/12; B60R 2001/1253; B60R 2300/802; G06F 3/1446; G06V 20/58; G09G 3/3406; G09G 2320/062; G09G 2380/10; H04N 7/181
See application file for complete search history.

(56) References Cited

U.S. PATENT DOCUMENTS

| | | | | |
|---|---|---|---|---|
| 10,433,110 | B1 * | 10/2019 | Bergerhouse | ......... H04W 4/023 |
| 2017/0036599 | A1 * | 2/2017 | Siddiqui | ................... B60R 1/28 |
| 2019/0222770 | A1 * | 7/2019 | Tsai | .......................... B60R 1/28 |
| 2024/0326530 | A1 * | 10/2024 | Imai | ......................... B60R 1/27 |
| 2024/0421269 | A1 * | 12/2024 | Chen | ................... H10H 20/852 |

FOREIGN PATENT DOCUMENTS

| | | |
|---|---|---|
| CN | 110450727 | 11/2019 |
| CN | 118254676 | 6/2024 |
| CN | 118991811 | 11/2024 |

* cited by examiner

*Primary Examiner* — Michael E Teitelbaum

(74) *Attorney, Agent, or Firm* — ScienBiziP, P.C.

(57) ABSTRACT

Embodiments of the present disclosure relate to a blind spot assistance display system including a camera module, a display control module, and a display module. The camera module installed on an exterior of a vehicle acquires a first image within a preset range including a blind spot obscured by an A-pillar. The display control module connects to the camera module, receives the first image and outputs a display control signal. The display module, installed inside the vehicle, displays images based on the display control signal. When an obstacle is detected within a preset distance from the vehicle, the display module activates; and when no obstacle is detected within the first image, or when an obstacle is detected within the first image beyond the preset distance from the vehicle, the display module deactivates.

16 Claims, 5 Drawing Sheets

1

BLIND SPOT ASSISTANCE DISPLAY SYSTEM AND VEHICLE

FIELD

The subject matter herein generally relates to vehicles, specifically to a blind spot assistance display system and a vehicle including the blind spot assistance display system.

BACKGROUND

An A-pillar of a vehicle refers to a connecting pillar that connects the roof and the front compartment on the left front and right front of the vehicle. The A-pillar is typically located between the engine compartment and the passenger compartment, and above the left and right rearview mirrors. When the vehicle is turning, changing lanes, or driving straight at low speed, a portion of the driver's field of vision is easily blocked by the A-pillar, resulting in a blind spot and causing potential safety hazards.

Therefore, there is room for improvement in the art.

BRIEF DESCRIPTION OF THE DRAWINGS

Implementations of the present disclosure will now be described, by way of embodiment, with reference to the attached figures.

DETAILED DESCRIPTION

Figure 1:
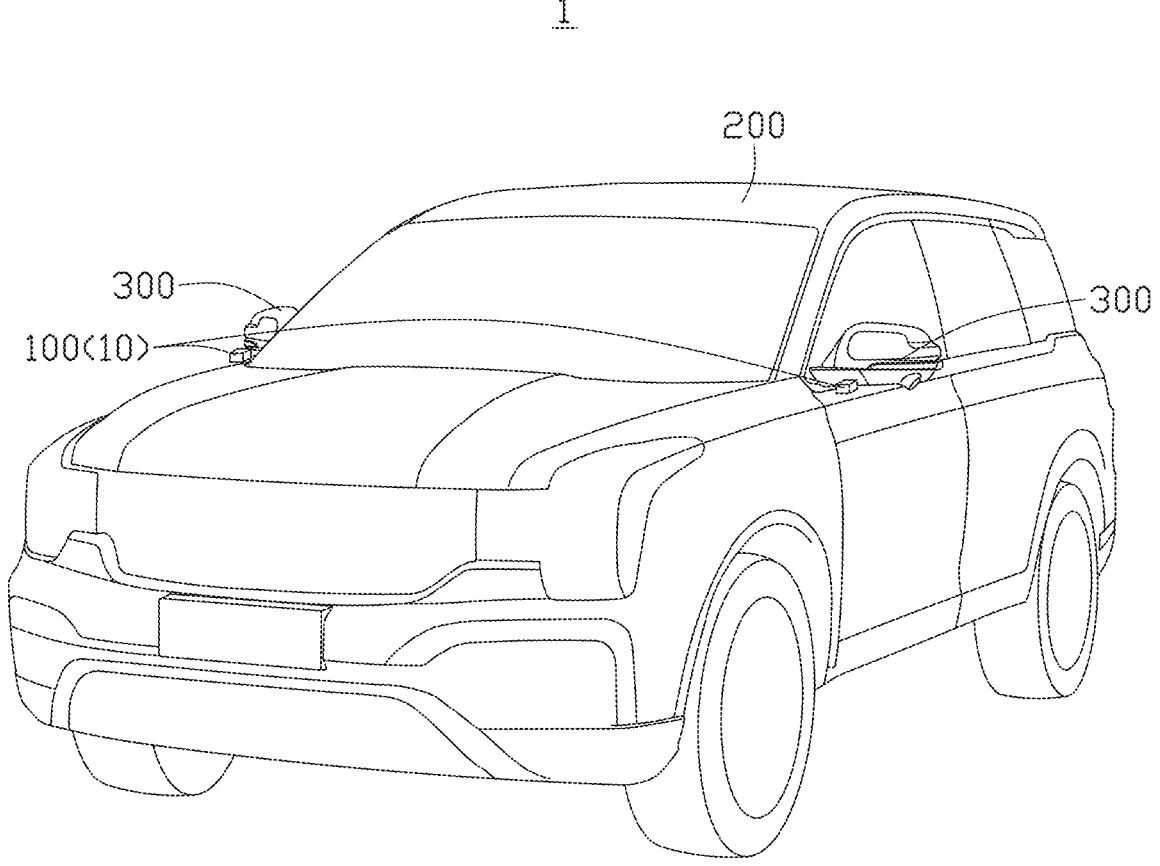
FIG. 1 is a structural diagram of a vehicle according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which references indicate similar elements. It should be noted that references to "an" or "one" embodiment in this disclosure are not necessarily to the same embodiment, and such references can mean "at least one".

Embodiments of the present disclosure provide a blind spot assistance display system for vehicles. Due to the obstruction caused by the vehicle's A-pillars, the drivers experience visual blind spots when driving. The blind spot assistance display system of the present disclosure embodiments is configured to acquire and display images within these blind spots, so that drivers can judge the environment of the blind spots according to the images, thereby reducing potential safety hazards.

Figure 2:
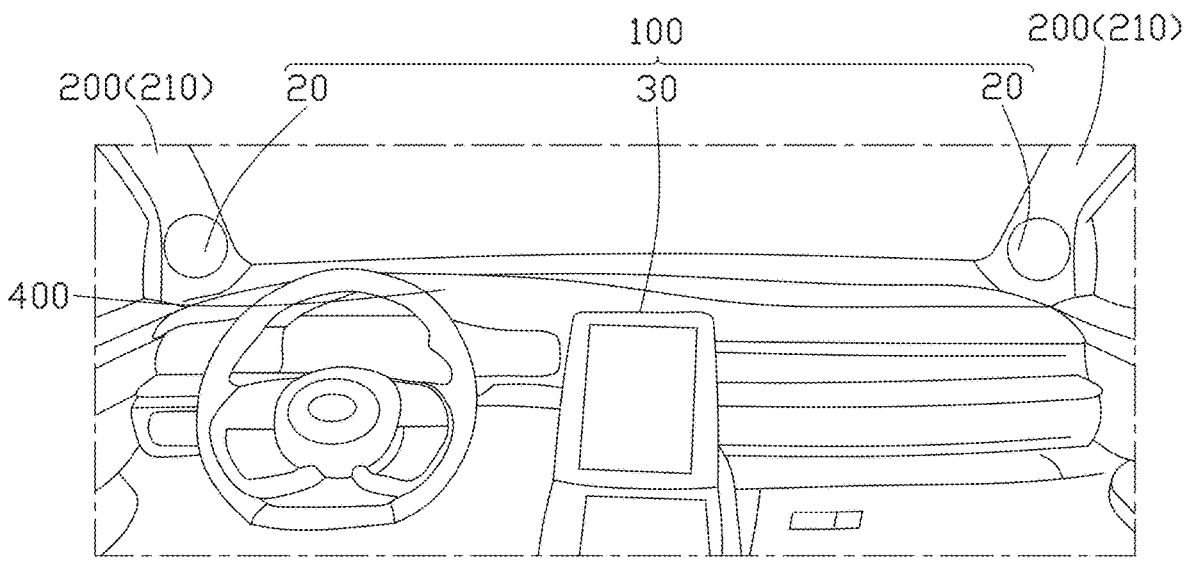
FIG. 2 is a partial structural diagram showing an interior of the vehicle in FIG. 1.

As shown in FIG. 1 and FIG. 2, the vehicle 1 includes a blind spot assistance display system 100, a vehicle body 200, two rearview mirrors 300, and a center console 400. The blind spot assistance display system 100 is mounted on the vehicle body 200. The rearview mirrors 300 are installed on the exterior of the vehicle body 200. The center console 400 is inside the vehicle body 200.

The vehicle body 200 includes A-pillars 210 that connect the roof and the sides of the vehicle body. The blind spot assistance display system 100 includes a camera module 10, a display module 20, and a display control module 30.

Specifically, the camera module 10 is on the exterior of the vehicle body 200 and installed below the rearview mirrors 300. The camera module 10 is configured to acquire a first image within a preset range outside the vehicle 1. The preset range includes driver's blind spots obscured by the A-pillars 210 of the vehicle 1.

The display control module 30 is partially located inside the center console 400 and partially embedded within the vehicle body 200. The display control module 30 is electrically connected to the camera module 10 and is configured to receive the first image and output a display control signal according to the content of the first image.

The display module 20 is installed inside the vehicle body 200, electrically connected to the display control module 30, and configured to display at least a portion of the first image according to the display control signal 30 when activated.

In one embodiment, the blind spot assistance display system 100 includes two camera modules 10 and two display modules 20.

Each camera module 10 is installed below a corresponding one of the two rearview mirrors 300. Each display module 20 is installed on a corresponding one of the two A-pillars 210.

In other embodiments, the two camera modules 10 may be respectively located on both sides of the front fenders outside the vehicle 1.

Each of the two camera modules 10 is configured to acquire the first image of the blind spot blocked by the corresponding one of the two A-pillars 210 and transmit the first image to the corresponding one of the two display module 20.

The camera module 10 includes a camera (not shown) and a camera electronic control unit (not shown). The camera is configured to acquire the first image, and the camera electronic control unit is configured to perform preliminary processing on the first image to clearly transmit the first image to other control modules.

In one embodiment, an outer profile of each display module 20 is circular created using anisotropic cutting technology. Each of the two display modules 20 is embedded in the corresponding one of the two A-pillars 210.

In one embodiment, each of the two display modules 20 is a transflective display. Compared with organic light-emitting diode (OLED) displays, transflective displays have lower manufacturing costs. Therefore, using transflective displays as the display module of the blind spot assistance display system helps reduce manufacturing costs and facilitates combination with the A-pillars of the vehicle 1.

Figure 3:
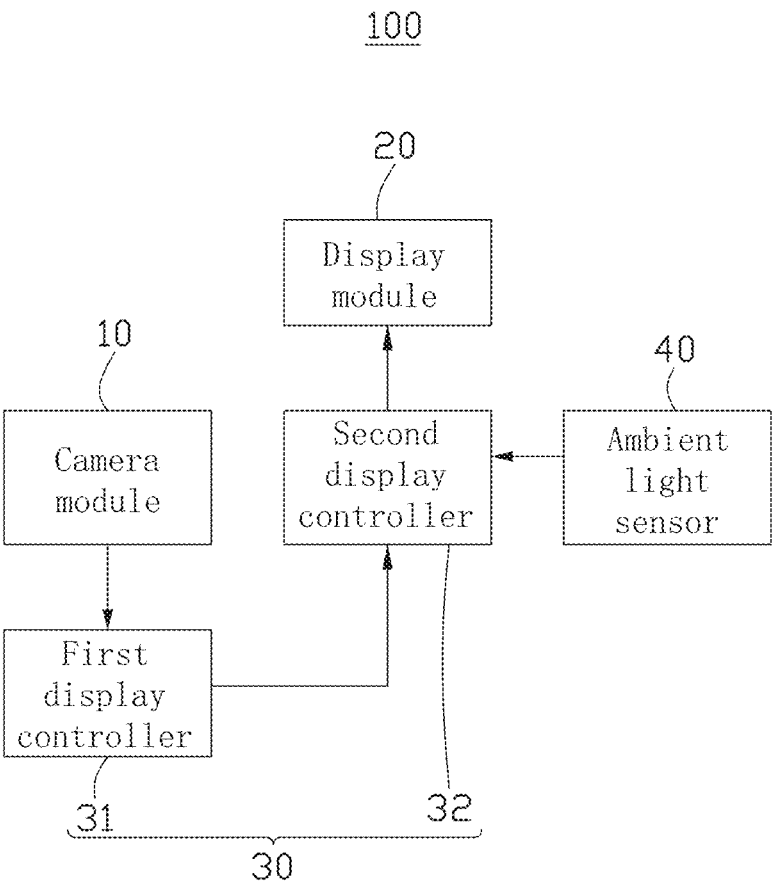
FIG. 3 is a modular structure diagram of a blind spot assistance display system according to an embodiment of the present disclosure.

As shown in FIG. 3, the display control module 30 includes a first display controller 31 and a second display controller 32. The first display controller 31 is electrically connected to the camera module 10. The second display controller 32 is electrically connected to the first display controller 31 and the display modules 20.

In one embodiment, the first display controller 31 can be but not limited to an automatic driving control unit (ADCU), and the second display controller 32 can be but not limited to an in-vehicle infotainment (IVI) system.

The first display controller 31 is configured to receive the first image and identify the content in the first image, so as to output a first electrical signal or a second electrical signal to the second display controller 32 according to the content in the first image.

In one embodiment, the first display controller 31 is configured to identify whether the first image includes an obstacle. The obstacle includes other vehicles, motorcycles, bicycles, roadblocks, and pedestrians walking on the road. When the vehicle 1 is traveling in a narrow alley, the obstacle can be a wall.

When the first display controller 31 detects that the first image includes an obstacle and a distance between the obstacle and the vehicle 1 is less than a preset distance, the first display controller 31 outputs the first electrical signal.

When the first display controller 31 detects that the first image does not include an obstacle, or the first image includes an obstacle but the distance between the obstacle and the vehicle 1 is greater than the preset distance, the first display controller 31 outputs the second electrical signal.

The "preset distance" refers to a safe distance between the obstacle and the vehicle 1, and the safe distance is usually 1.5 meters or 2 meters. When the distance between the obstacle and the vehicle 1 is less than the safe distance, it is easy to cause a safety accident when the driver is driving the vehicle 1.

The second display controller 32 is configured to output a display control signal when receiving the first electrical signal and the second electrical signal, so as to control a working mode of the display module 20. When the second display controller 32 receives the first electrical signal, the second display controller 32 activates the display module 20, so that the display module 10 displays at least a portion of the first image and the second image according to the display control signal.

The content of the second image includes warning information or warning symbols for reminding the driver. The warning information can be the distance information between the obstacle and the vehicle 1, and the warning symbol can be a road safety warning sign. The content in the second image is configured to remind the driver that the distance between the obstacle and the vehicle 1 is less than the safe distance, and to pay attention to maintaining or reducing the vehicle speed.

When the second display controller 32 receives the second electrical signal, the second display controller 32 controls the display modules 20 to be in a "off" state, preventing the display modules 20 from displaying images for a long time, thereby causing a visual burden on the driver's normal driving.

If the driver turns on the turn signal during the process of driving the vehicle 1, the second display controller 32 is further configured to control the display module 20 to be in an "on" state when recognizing that the turn signal is turned on, so that the display modules 20 display at least a portion of the first image and the second image according to the display control signal.

When the driver turns on the left turn signal of the vehicle 1, the second display controller 32 controls the display module 20 located on the left A-pillar of the vehicle 1 to be in an "on" state. When the driver turns on the right turn signal of the vehicle 1, the second display controller 32 controls the display module 20 located on the right A-pillar of the vehicle 1 to be in an "on" state.

In one embodiment, when the second display controller 32 receives the first electrical signal, the second display controller 32 intercepts the portion of the first image including the obstacle and outputs the display control signal, so that the display modules 20 display the portion of the first image including the obstacle according to the display control signal, so that the display modules 20 highlight the portion of the first image including the obstacle, improving the driver's attention to the obstacle, thereby improving driving safety.

Figure 4:
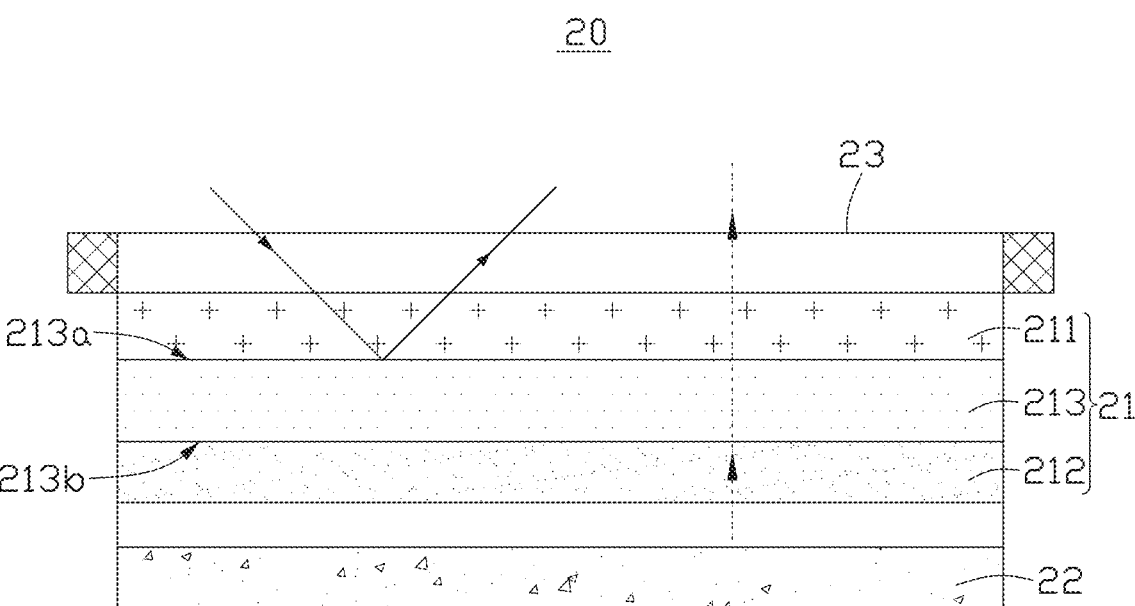
FIG. 4 is a structural diagram of a display module in FIG. 3.

As shown in FIG. 4, the display module 20 includes a display unit 21 and a backlight unit 22. The backlight unit 22 is configured to provide backlight. The display unit 21 is configured to receive the backlight and display at least the portion of the first image according to the display control signal. The second display controller 32 is further configured to adjust the brightness of the backlight unit 22.

The display unit 21 includes a first substrate 211, a second substrate 212, and a transflective layer 213 between the first substrate 211 and the second substrate 212. The backlight unit 22 is on a side of the second substrate 212 away from the transflective layer 213. The transflective layer 213 has a first surface 213a facing the first substrate 211 and a second surface 213b opposite the first surface 213a and facing the second substrate 212.

When external light passes through the first substrate 211 and is incident on the first surface 213a of the transflective layer 213, the transflective layer 213 reflects the external light, so that the external light is transmitted out of the display unit 21 again through the first substrate 211. When the light emitted by the backlight unit 22 passes through the second substrate 212 and is incident on the second surface 213b of the transflective layer 213, the transflective layer 213 transmits the light from the backlight unit 22, so that the backlight emitted by the backlight unit 22 is sequentially transmitted out of the display unit 21 through the transflective layer 213 and the first substrate 211.

The display module 20 further includes a light-transmitting cover plate 23. The cover plate 23 is located on a side of the first substrate 211 away from the transflective layer 213. The cover plate 23 covers the display unit 21. When the display module 20 is impacted, the cover plate 23 is configured to protect the display unit 21, preventing the display unit 21 from breaking due to the impact and splashing onto the driver and passengers.

In one embodiment, a portion of the cover plate 23 that is in contact with the display unit 21 is transparent, and a color of the portion of the cover plate 23 that is not in contact with the display unit 21 is consistent with an interior color of the vehicle, so that the display modules 20 can be better integrated into the internal environment of the vehicle and the viewing experience of the driver when viewing the display module 20 can be improved.

As shown in FIG. 3, the blind spot assistance display system 100 further includes an ambient light sensor 40 in the vehicle body 200. The ambient light sensor 40 is electrically connected to the second display controller 32 and configured to convert ambient light into a third electrical signal and transmit the third electrical signal to the second display controller 32. The second display controller 32 is configured to adjust the brightness of the backlight unit 22 according to the third electrical signal.

When an amplitude of the third electrical signal is large, it indicates that the external environment is bright. For example, the driver is driving the vehicle during the day. Most of the external ambient light passes through the first substrate 211 and is incident on the first surface 213a of the transflective layer 213 and is transmitted to the outside of the display module 20 through the first substrate 211 after being reflected by the transflective layer 213, so that the display unit 21 emits light to display the corresponding image. Since the brightness of the external ambient light is sufficient, the display module 20 can be provided with a light source by the external ambient light to display a clear image. At this time, the second display controller 32 is configured to reduce the brightness of the backlight emitted by the backlight unit 22, thereby saving electrical energy.

When the amplitude of the third electrical signal is small, it indicates that the external environment is dark. For example, the driver is driving the vehicle in the evening or at night. A small amount of external ambient light can still pass through the first substrate 211 and be incident on the first surface 213a of the transflective layer 213 and be transmitted to the outside of the display module 20 through the first substrate 211 after being reflected by the transflective layer 213, thereby providing a weak light source for the display unit 21. That is, it is difficult for external ambient light to make the display module 20 display a clear image. At this time, the second display controller 32 is configured to increase the brightness of the backlight emitted by the backlight unit 22. The light emitted by the backlight unit 22 is sequentially transmitted out of the display module 20 through the second substrate 212, the transflective layer 213, the first substrate 211, and the cover plate 23, so that the display unit 21 has sufficient light brightness to display a clear image.

In the blind spot assistance display system 100, the camera module 10 is arranged outside the vehicle 1 to acquire the first image of the blind spot blocked by the A-pillar of the vehicle. The display module 20 is arranged inside the vehicle 1 to display the first image, so that the driver of the vehicle 1 can see the picture of the blind spot, which is convenient for the driver to judge the environment around the vehicle 1 and effectively reduce the occurrence of safety accidents.

Moreover, the display control module 30 is configured to control the display module 20 to be in the "on" state or in the "off" state according to the first image.

When the first display controller 31 detects that the first image does not include an obstacle, or the first image includes an obstacle but the distance between the obstacle and the vehicle 1 is greater than the preset distance, the second display controller 32 controls the display module 20 to be in the "off" state, which is beneficial to preventing the display module 20 from displaying pictures for a long time and distracting the driver's attention, thereby reducing the probability of safety accidents.

When the first display controller 31 detects that the first image includes an obstacle and the distance between the obstacle and the vehicle 1 is less than the preset distance, the second display controller 32 controls the display module 20 to be in the "on" state, so that the display module 20 displays the image in the blind spot, which is convenient for the driver to see the environment in the blind spot.

The ambient light sensor 40 is configured to detect the ambient light intensity, collect and convert the light radiation of the surrounding light into an electrical signal for measurement. The ambient light sensor 40 is configured to generate a third electrical signal according to the ambient light.

When the brightness of the external ambient light is strong, the amplitude of the third electrical signal is large. After receiving the third electrical signal, the second display controller 32 reduces the brightness of the light emitted by the backlight unit 22, thereby saving power. At this time, the light intensity of the external light entering the display unit 21 through the first substrate 211 is sufficient, and the transflective layer 213 is configured to reflect the external light from the first substrate 211, so that the display module 20 displays an image.

When the brightness of the external ambient light is weak, the amplitude of the third electrical signal is small. After receiving the third electrical signal, the second display controller 32 increases the brightness of the light emitted by the backlight unit 22, so that the driver can see the display picture on the display module 20 clearly in a dark environment.

Figure 5:
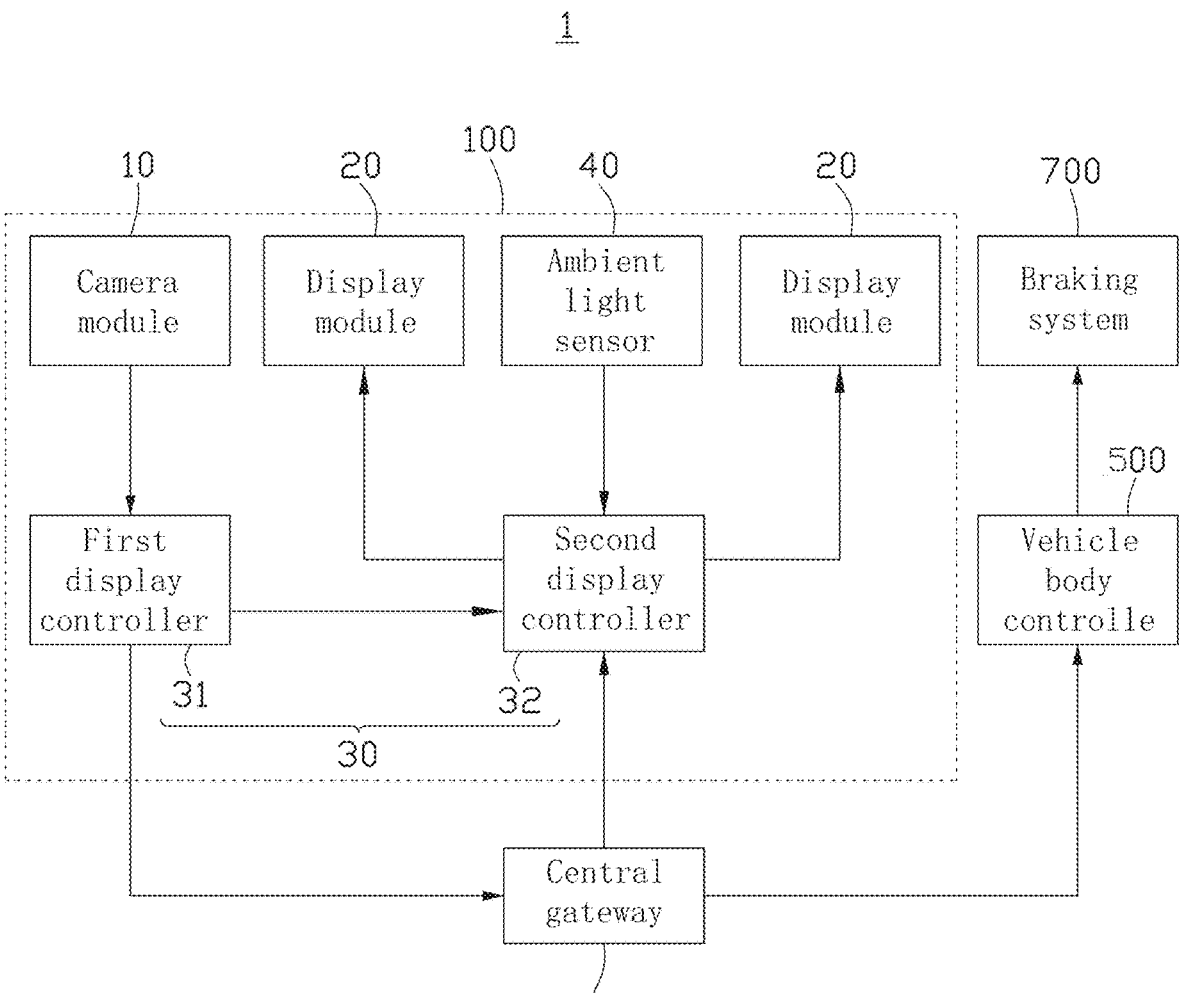
FIG. 5 is a modular structural diagram of the vehicle according to an embodiment of the present disclosure.

As shown in FIG. 5, the vehicle 1 further includes a vehicle control unit 500, a central gateway 600 and a braking system 700.

The vehicle body controller 500 is electrically connected to the first display controller 31 and the braking system 700. When the first display controller 31 detects that there is an obstacle in the first image and the distance between the obstacle and the vehicle body 100 of the vehicle 1 is less than the preset distance, the first display controller 31 outputs a fourth electrical signal. After receiving the fourth electrical signal, the vehicle body controller 500 can start the braking system 700 of the vehicle 1, so that the vehicle body 200 stops traveling, thereby effectively preventing the occurrence of accidents.

The central gateway 600 is electrically connected to the first display controller 31 and the second display controller 32 and the vehicle body controller 500. The central gateway 600 is configured to transmit the first electrical signal or the second electrical signal from the first display controller 31 to the second display controller 32, so that the second display controller 32 controls the display module 20 located on the two A-pillars of the vehicle 1 to be in the "on" state after receiving the first electrical signal, and the second display controller 32 controls the display module 20 located on the two A-pillars of the vehicle 1 to be in the "off" state after receiving the second electrical signal.

The central gateway 600 is further configured to transmit the fourth electrical signal from the first display controller 31 to the vehicle body controller 500.

The central gateway 600 is further configured to receive signals from other control modules in the vehicle 1 and transmit the received signals to the corresponding control modules, so as to realize signal transmission between different control modules and enable the corresponding control modules to realize corresponding functions.

The display control signal is a signal related to image transmission. After receiving the display control signal, the display module 20 displays the corresponding image.

The first electrical signal and the second electrical signal are signals related to sensing the scene where the vehicle 1 is located. The second display controller 32 activates the display module 20 when sensing that there is a potential danger around the vehicle 1 according to the first electrical signal, and the second display controller 32 deactivates the display module 20 when not sensing that there is a potential danger around the vehicle 1 according to the second electrical signal.

The fourth electrical signal is a signal related to the warning function of the vehicle 1. After receiving the fourth electrical signal, the hardware device of the vehicle 1 causes the vehicle 1 to perform corresponding actions, such as braking and honking.

It is to be understood, even though information and advantages of the present exemplary embodiments have been set forth in the foregoing description, together with details of the structures and functions of the present exemplary embodiments, the disclosure is illustrative only. Changes may be made in detail, especially in matters of shape, size, and arrangement of parts within the principles of the present exemplary embodiments to the full extent indicated by the plain meaning of the terms in which the appended claims are expressed.

What is claimed is:

1. A blind spot assistance display system, comprising:
a camera module installable on an exterior of a vehicle and acquire a first image within a preset range outside of the vehicle, wherein the preset range comprises a blind spot obscured by an A-pillar of the vehicle;
a display control module electrically connected to the camera module and configured to receive the first image and outputting a display control signal according to content of the first image; and
a display module installable inside the vehicle and electrically connected to the display control module,
wherein the display control module is configured to:
activate the display module and control the display module to display at least a portion of the first image according to the display control signal when an obstacle is detected within the first image at a distance less than a preset distance from the vehicle; and
deactivate the display module when no obstacle is detected within the first image, or when an obstacle is detected within the first image at a distance greater than the preset distance from the vehicle.

2. The blind spot assistance display system of claim 1, wherein the display control module comprises:
a first display controller configured to:
receive the first image;
output a first electrical signal when an obstacle is detected within the first image at a distance less than the preset distance from the vehicle; and
output a second electrical signal when no obstacle is detected within the first image, or when an obstacle is detected within the first image at a distance greater than the preset distance from the vehicle; and
a second display controller electrically connected to the first display controller and the display module and configured to:
output the display control signal upon receiving the first electrical signal, activate the display module, and control the display module to simultaneously display at least a portion of the first image and a second image according to the display control signal, wherein content in the second image includes a warning message or a warning symbol; and
deactivate the display module upon receiving the second electrical signal.

3. The blind spot assistance display system of claim 2, wherein the second display controller is further configured to intercept the portion of the first image comprising the obstacle upon receiving the first electrical signal; and output the display control signal to control the display module to display the portion of the first image comprising the obstacle.

4. The blind spot assistance display system of claim 2, wherein the display module comprises a backlight unit and a display unit; the backlight unit is configured to provide backlight; and the display unit is configured to receive the backlight and display at least the portion of the first image according to the display control signal and display the second image according to the first electrical signal.

5. The blind spot assistance display system of claim 4, further comprising an ambient light sensor electrically connected to the second display controller and configured to convert ambient light into a third electrical signal and transmitting the third electrical signal to the second display controller, wherein the second display controller is further configured to adjust the brightness of the backlight unit according to the third electrical signal.

6. The blind spot assistance display system of claim 4, wherein an outer profile of the display module is circular.

7. The blind spot assistance display system of claim 1, wherein the camera module comprises two camera modules, each of the two camera modules is installable below a corresponding one of two exterior rearview mirrors of the vehicle; and
the display module comprises two display modules, and each of the two display modules is installable on a corresponding one of two A-pillars inside the vehicle.

8. A vehicle, comprising:
a vehicle body comprising an A-pillar; and
a blind spot assistance display system comprising:
a camera module installed on an exterior of the vehicle body and configured to acquire a first image within a preset range outside of the vehicle, wherein the preset range comprises a blind spot obscured by the A-pillar;
a display control module electrically connected to the camera module and configured to receive the first image and outputting a display control signal according to content of the first image; and
a display module installed inside the vehicle body and electrically connected to the display control module;
wherein the display control module is configured to:
activate the display module and control the display module to display at least a portion of the first image according to the display control signal when an obstacle is detected within the first image at a distance less than a preset distance from the vehicle; and
deactivate the display module when no obstacle is detected within the first image, or when an obstacle is detected within the first image at a distance greater than the preset distance from the vehicle.

9. The vehicle of claim 8, wherein the display control module comprises:
a first display controller configured to:
receive the first image;
output a first electrical signal when an obstacle is detected within the first image at a distance less than the preset distance from the vehicle; and
output a second electrical signal when no obstacle is detected within the first image, or when an obstacle is detected within the first image at a distance greater than the preset distance from the vehicle; and
a second display controller electrically connected to the first display controller and the display module and configured to:

output the display control signal upon receiving the first electrical signal, activate the display module, and control the display module to simultaneously display at least a portion of the first image and a second image according to the display control signal, wherein content in the second image includes a warning message or a warning symbol; and deactivate the display module upon receiving the second electrical signal.

10. The vehicle of claim 9, wherein the second display controller is further configured to:

intercept the portion of the first image comprising the obstacle upon receiving the first electrical signal; and output the display control signal to control the display module to display the portion of the first image comprising the obstacle.

11. The vehicle of claim 9, wherein the display module comprises a backlight unit and a display unit; the backlight unit is configured to provide backlight; the display unit is configured to receive the backlight and display at least the portion of the first image according to the display control signal and display the second image according to the first electrical signal.

12. The vehicle of claim 11, wherein the blind spot assistance display system further comprises an ambient light sensor electrically connected to the second display controller and configured to convert ambient light into a third electrical signal and transmitting the third electrical signal to the second display controller, wherein the second display controller is further configured to adjust the brightness of the backlight unit according to the third electrical signal.

13. The vehicle of claim 11, wherein an outer profile of the display module is circular.

14. The vehicle of claim 9, further comprising two exterior rearview mirrors installed on an exterior of the vehicle body, wherein the camera module comprises two camera modules, each of the two camera modules is installed below a corresponding one of the two exterior rearview mirrors, the display module comprises two display modules, the vehicle comprising two A-pillars, and each of the two display modules is installed on a corresponding one of two A-pillars.

15. The vehicle of claim 9, further comprising a vehicle body controller electrically connected to the display control module, wherein the display control module is configured to output a fourth electrical signal when an obstacle is detected within the first image at a distance less than a preset distance from the vehicle, and the vehicle body controller is configured to control the vehicle to stop traveling upon receiving the fourth electrical signal.

16. The vehicle of claim 15, further comprising a central gateway, wherein the central gateway is electrically connected to the first display controller, the second display controller, and the vehicle body controller, for: transmitting the first electrical signal and the second electrical signal from the first display controller to the second display controller, and transmitting the fourth electrical signal from the display control module to the vehicle body controller.

* * * * *